April 5, 1927.  K. A. FERKEL  1,623,666
TEMPERATURE INDICATING MEANS
Filed Aug. 10, 1926
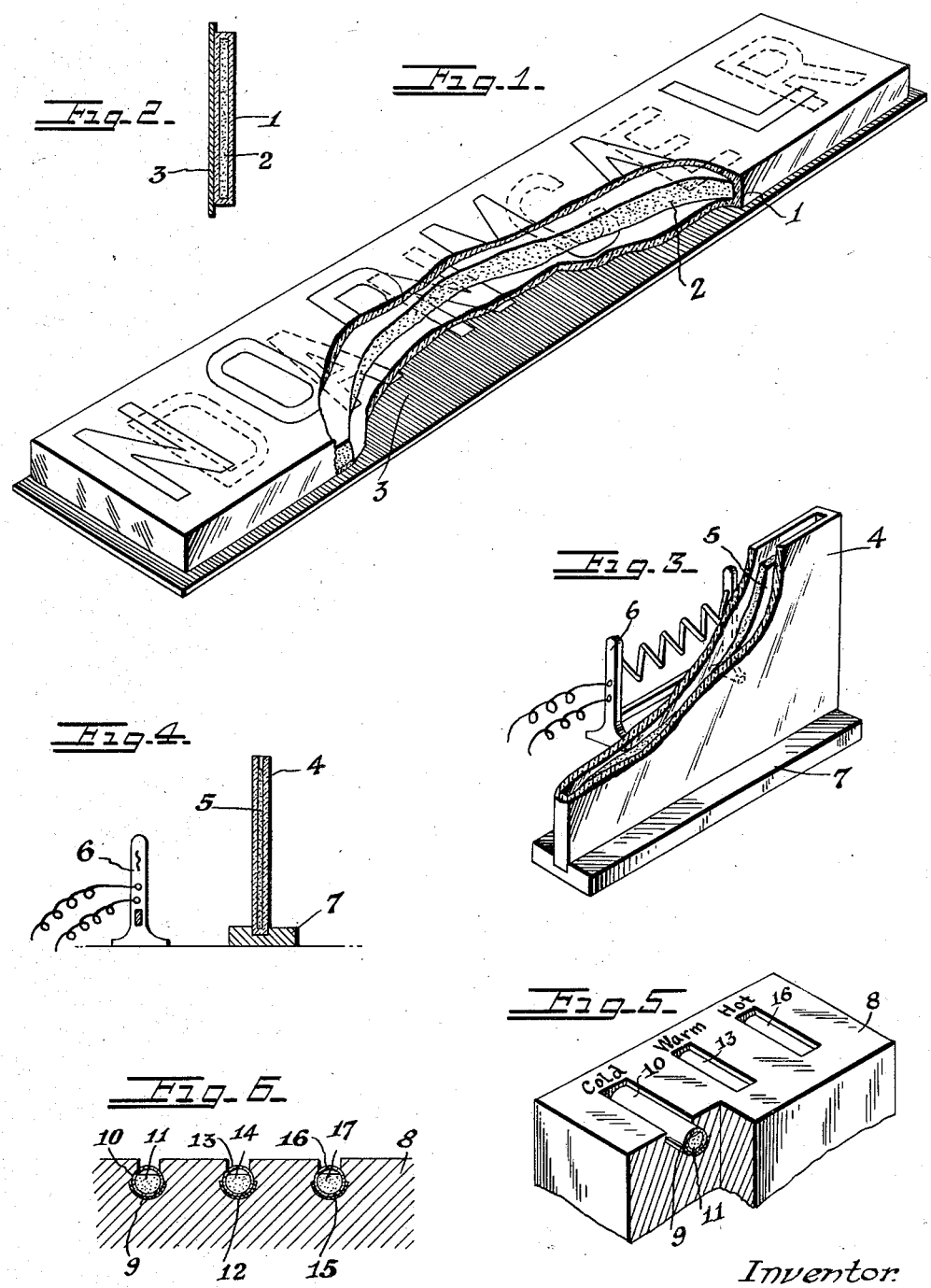
Inventor
Karl A. Ferkel Patented Apr. 5, 1927.

1,623,666

UNITED STATES PATENT OFFICE.

KARL A. FERKEL, OF LOS ANGELES, CALIFORNIA.

TEMPERATURE-INDICATING MEANS.

Application filed August 10, 1926. Serial No. 128,430.

This invention relates to means for indicating temperature through the use of a substance which is naturally opaque, but which becomes transparent when heated, and opaque again when cool. This substance is used as a curtain to hide from view an object, design or element. As long as the temperature is unchanged the substance remains opaque and the object, design or element hidden; however, if the temperature is raised sufficiently, the substance will be rendered transparent and the previously hidden object, design or element will become visible therethrough. Upon cooling, the substance again becomes opaque and the object, design or element hidden from view thereby. By varying the composition of the substance, the opaque-transparent changing point may be set at any desired temperature. Hence it is possible to use this invention as a signal to give warning when a desired temperature has been reached, or to use two or more such devices as a means to keep temperatures within certain specified limits.

In my Patent No. 1,558,153 I disclose a highly satisfactory means of temperature indication, using a container with an element therein and with a substance placed in the container covering said element. This substance is normally opaque, but is rendered transparent when heated. The element or design covered by the substance is hidden from view as long as the substance remained opaque and is visible only when the substance is rendered transparent by heat. As pointed out in that patent, such an indicator has many useful applications and is a practical means of temperature indication.

In certain cases, however, it is desirable to separate the element or signaling member from actual contact with the substance and not allow the substance to cover the element as described in my Patent No. 1,558,153. This becomes apparent when indicating higher temperatures. The substances used are chemical compounds, most of which act as reducing, or oxidizing agents, and when heated often attack, discolor and even destroy the element. In order to overcome this, it is necessary to place the element outside the container and free from all contact with the substance. The container in this case must be constructed of such transparent material that the element can be seen when the substance is in its transparent condition. The container may be made entirely of a transparent material, such as glass, or it may have transparent side walls only. In any case, the purpose is the same, mainly to use a container which will support the substance and keep it from the element, and which is sufficiently transparent as to allow the element to be seen through it. Such a container will be more fully described below.

Another advantage in placing the element outside of the container is that such a device can be used as a pyrometer, or heat meter. If energy in the form of radiant heat be allowed to strike a body, a certain proportion of the total impinging heat energy is absorbed. Hence, if a screen of an opaque substance which becomes transparent when sufficiently heated is placed at a measured distance in front of an element or object and the element radiates sufficient heat to change the substance from an opaque condition to a transparent form and thereby makes the element visible, it is possible to compute the temperature of the element by considering the factors involved, such as time required, distance between element and substances, the opaque-transparent changing point of the substance, etc. Such a device as this can be used to indicate the temperature of very highly heated objects, which, because of their high temperature, would destroy both container and substance if allowed to come in contact with them.

Another point to be considered in constructing such an indicator for use in high temperature indication is the expansion of the container. One embodiment, as described in my previous Patent No. 1,558,153, consisted of a container having a metal back, which was the element, and a transparent frontal member. These two in combination with a gasket formed the container of the substance. At low temperature the gasket would absorb any difference in expansion between the metal and transparent members. At high temperature, however, it is advisable to construct the entire container of the same transparent material, preferably of one piece, to eliminate any difficulties arising from difference in expansion. For this reason, a container constructed of a single piece of transparent material extends the scope and use of the invention enormously and practically necessitates placing the element outside of the container. By placing the element outside of the container, the size, shape, location and type of element used is not limited to the size or shape of the container. The element may be a surface, object, design or may be painted on the wall of the container. In order that my invention may be fully explained I have illustrated this embodiment in three different forms on the accompanying drawing, as follows:

Figure 1 is a perspective view of my invention, with section cut away showing one arrangement of container, substance and element.

Figure 2 is a cross section of the same.

Figure 3 is a perspective view showing the element in a different form and placed away from the container and substance.

Figure 4 is a cross section of the same.

Figure 5 shows a plurality of indicators embodied in a body which might form an important part of a machine, with parts cut away showing arrangement of container and element.

Figure 6 is a cross section of the same.

Referring now in detail to the drawings, I will describe the embodiment of my invention shown for descriptive purposes. Figs. 1 and 2 show a container designated as, 1. This container being constructed of transparent material enclosing the substance, 2, so as to retain it and to keep it from contact with the element, 3. The container, 1, may be of any shape or size, and may be made with suitable means for mounting or attaching to other objects. The element, 3, in this embodiment is a design, preferably of red, as indicated by the shading with the word "Danger" in conspicuous letters. The substance, 2, which will be disclosed more in detail below, is opaque at one temperature, but is transparent at another temperature. Hence, when a substance, 2, is opaque, the element, 3, is hidden. However, if, due to a change in temperature, the substance is rendered transparent, the element becomes visible and a means of temperature indication is established.

Fig. 3 shows another embodiment of my invention. In this case it is shown as a means of indicating high temperature, a type of pyrometer, or heat meter. The substance, 5, is normally opaque, but becomes transparent as soon as heated to a certain temperature. This substance has suitable containing and supporting means, 4, and, 7, a container having transparent side walls. The element, 6, in this case is an electrical resistance, of which it is desired to know the temperature. The substance is so placed as to hide from view and to absorb heat from the element. If the distance from the element to the substance, the time it takes for the substance to change from opaqueness to transparency and thereby render the element visible, the opaque-transparent changing point of a substance, etc., be observed it is possible to ascertain the temperature of the element. Such a device as this may be used to determine the temperature of molten metals and other exceedingly hot objects. The container, or containing means, may be constructed so as to allow the removal of one substance and the placing of another substance with a different opaque-transparent changing point in its place.

In Figs. 5 and 6, I have shown three indicators mounted in a body, 8, which may be a part of a machine or instrument of which it is desired to know the temperature. Each indicator has its respective container, 10, 13, and 16, with an opaque substance placed in each and designated 11, 14, and 17, each of which is opaque at one temperature and transparent at a higher temperature, with an element attached to each and designated 9, 12, and 15. The elements are so placed as to be hidden when the substance is opaque, and to be visible when the substance is transparent. The containers, 10, 13, and 16, are of glass, the substances 11, 14, and 17, being sealed in the glass containers. The elements, 9, 12, and 15, are attached to their respective containers as shown. The opaque substance, 11, in container, 10, becomes transparent at a relatively low temperature, hence as heat is applied and the substance, 11, becomes transparent, and the element, 9, becomes visible, it is known that the temperature has reached the point of "cold." If more heat is applied, the substance, 14, having a higher opaque-transparent changing point, will become transparent and expose element, 12, and it will be known that the temperature has reached the point of "warm." In like manner, if more heat is applied, the substance, 17, having a still higher opaque-transparent changing point, will become transparent and expose element, 15, and it will be known that the temperature has reached the point of "hot." If the body is allowed to cool, the substances will again become opaque at their respective opaque-transparent changing points, and it is possible to observe the cooling rate of the body, 8, and determine at any time whether the body is "cold," "warm," or "hot."

Referring now to a specific substance which will function in the manner referred to: Most chemical compounds have a definite, specific melting point. Many of them are opaque when in the solid or crystalline form and transparent when in the melted, or liquid, form. Such a compound may be used as a substance, for example, benzoic acid, $C_6H_5CO_2H$, is a white, opaque substance below its melting point of 123° centigrade. However, at its melting point, and above, it is a clear, transparent substance. Such a compound as benzoic acid can be used as the substance for such embodiments as shown in Figs. 1 and 3. In such an embodiment as shown in Fig. 5, where a plurality of substances is required, three compounds which could be used as substances are m-dinitro-benzene, benzoic acid and benzilic acid, which change from opaque to transparent at 90° C., 123° C., and 150° C. respectively.

I do not limit myself to certain compounds, nor am I dependent upon the fact that a substance must melt before it changes from opaqueness to transparency, as a very satisfactory substance can be made using an emulsion. Neither do I limit myself to any certain type of container, element or place of application.

Having thus described my invention, what I claim as new and desire to secure by Letters Patent is:

1. Temperature indicating means, including a substance having the property of being opaque at one temperature and transparent at another temperature; means for supporting same; and an element not in contact with said substance, but so placed as to be hidden when said substance is opaque and visible when said substance is transparent.

2. Temperature indicating means, including an opaque substance which becomes transparent when heated and opaque again when cool; a transparent container for same; and an element outside of said container, visible when substance is transparent, but hidden when substance is opaque.

3. In a device of the character referred to, a plurality of elements, a plurality of opaque substances hiding said elements from view, said substances being such as will turn from opaqueness to transparency at different predetermined temperatures, whereby said elements may be successively exposed to view, as the different temperatures are reached.

4. Temperature indicating means, including a container, having transparent walls, an element outside of said container so placed as to be visible through said walls, a substance placed in said container and normally opaque, said substance being adapted to be rendered transparent under heat, whereby to expose to view said element.

5. Temperature indicating means, including a container, having transparent side walls; an element placed near the outer surface of one of the side walls, visible through said side walls; a substance placed in said container between said side walls so as to hide from view said element; said substance having the property of being opaque at one temperature and becoming transparent at another temperature.

6. A temperature indicator consisting of a glass container; an element placed on the outside but visible through said container; a substance placed in said container, said substance changing from opaqueness to a transparency when heated, and from transparency to opaqueness when cooled, thus hiding or exposing said element.

Signed at Los Angeles, Los Angeles County, California, this 2nd day of August, 1926.

KARL A. FERKEL.